(12) United States Patent
Na et al.

(10) Patent No.: US 12,122,470 B2
(45) Date of Patent: Oct. 22, 2024

(54) MOUNTING APPARATUS

(71) Applicants: HYUNDAI MOTOR COMPANY, Seoul (KR); KIA CORPORATION, Seoul (KR)

(72) Inventors: Ho Kwon Na, Dangjin-si (KR); Yong Kyu Yoo, Yongin-si (KR); Jae Dong Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/204,205

(22) Filed: May 31, 2023

(65) Prior Publication Data

US 2024/0140547 A1 May 2, 2024

(30) Foreign Application Priority Data

Nov. 1, 2022 (KR) .......................... 10-2022-0143781

(51) Int. Cl.
*B62H 3/02* (2006.01)
(52) U.S. Cl.
CPC ...................................... *B62H 3/02* (2013.01)
(58) Field of Classification Search
CPC ... B62H 3/02; B62H 3/08; B62H 3/00; B62K 3/002
See application file for complete search history.

(56) References Cited

U.S. PATENT DOCUMENTS

| 639,991 | A | * | 12/1899 | Jewell | B62H 3/08 211/20 |
| 3,941,406 | A | * | 3/1976 | Eggleston | B60P 3/07 211/8 |
| 3,944,079 | A | * | 3/1976 | Boslough | B62H 3/10 211/5 |
| 4,373,303 | A | * | 2/1983 | Stratichuk | B60D 1/66 52/27 |
| 8,061,499 | B2 | * | 11/2011 | Khairallah | B62H 3/04 340/432 |
| 8,272,491 | B2 | | 9/2012 | Khairallah et al. | |
| 8,517,162 | B2 | | 8/2013 | Khairallah et al. | |
| 10,991,250 | B1 | * | 4/2021 | Arnold | G08G 1/146 |
| 11,712,975 | B2 | * | 8/2023 | Saint-Germain | B60L 53/16 320/108 |
| 2009/0266673 | A1 | | 10/2009 | Dallaire et al. | |
| 2012/0111070 | A1 | | 5/2012 | Khairallah et al. | |
| 2012/0324966 | A1 | | 12/2012 | Dallaire et al. | |

(Continued)

FOREIGN PATENT DOCUMENTS

| EP | 2112307 B1 | 11/2015 |
| JP | 2022034551 A | 3/2022 |

(Continued)

*Primary Examiner* — Ko H Chan
(74) *Attorney, Agent, or Firm* — Lempia Summerfield Katz LLC

(57) ABSTRACT

A mounting apparatus is disclosed and includes a base that is supported by a ground surface, and a holder supported by the base and having a holder recess configured such that a portion of a mobility vehicle is inserted thereinto. The holder supports the portion of the mobility vehicle such that the mobility vehicle is prevented from deviating from an upright state when the portion of the mobility vehicle is inserted into the holder recess.

11 Claims, 12 Drawing Sheets

(56) References Cited

U.S. PATENT DOCUMENTS

| | | | |
|---|---|---|---|
| 2015/0102714 A1* | 4/2015 | Gonzalez Hernandez | ............... A47B 81/00 211/20 |
| 2015/0152668 A1* | 6/2015 | Assenat | ............... B62H 3/02 70/277 |
| 2016/0311334 A1 | 10/2016 | Moravick et al. | |
| 2020/0031247 A1 | 1/2020 | Moravick et al. | |
| 2022/0242256 A1* | 8/2022 | Cho | ............... H02J 50/005 |

FOREIGN PATENT DOCUMENTS

| | | |
|---|---|---|
| KR | 200180346 Y1 | 5/2000 |
| KR | 100466452 B1 | 1/2005 |
| KR | 20210100829 A | 8/2021 |

\* cited by examiner

MOUNTING APPARATUS

CROSS-REFERENCE TO RELATED APPLICATION

This application claims the benefit of priority to Korean Patent Application No. 10-2022-0143781, filed in the Korean Intellectual Property Office on Nov. 1, 2022, the entire contents of which are incorporated herein by reference.

TECHNICAL FIELD

The present disclosure relates to a mounting apparatus.

BACKGROUND

As used throughout this patent, the phrase "mobility vehicle" is intended to mean any moving personal vehicle, device, machine, instrument, apparatus, or the like. In recent years, mobility vehicles that may be freely used by regular citizens have been actively developed. The mobility vehicles, for example, include electric kickboards that may be driven by using power of an electric motor. The user of the electric kickboard rents the electric kickboard that is parked around the user, and may freely park the electric kickboard at a location where parking is allowed.

The parking allowed location may include a sidewalk, on which several people pass, a front side of a store, and the like. However, when the electric kickboard is parked in the middle of the sidewalk, the parked electric kickboard may be turned over or the pedestrians may trip over the overturned electric kickboard. Furthermore, when the electric kickboard parked around an entrance of a store is turned over, movement of consumers who enter and exit from the store may be hindered, and thus, introduction of consumers into the store may be hindered.

SUMMARY

Given the problems mentioned above, there has been an increased demand for a mounting apparatus for an electric kickboard that may prevent damage to pedestrians on a sidewalk or consumers of a store due to overturning of the electric kickboard even when the electric kickboard is parked at a parking allowed location.

The present disclosure has been made to solve the above-mentioned problems occurring in the prior art while advantages achieved by the prior art are maintained intact.

An aspect of the present disclosure provides a mounting apparatus that may prevent an electric kickboard from deviating from an upright state such that the electric kickboard is prevented from being turned over when the electric kickboard is parked.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a mounting apparatus includes a base that is supported by a ground surface. The mounting apparatus also includes a holder supported by the base, the holder having a holder recess configured such that a portion of a mobility vehicle is inserted thereinto. The holder supports the portion of the mobility vehicle such that the mobility vehicle is prevented from deviating from an upright state when the portion of the mobility vehicle is inserted into the holder recess.

Furthermore, when a direction that is skewed from a forward direction, which is a direction in which the portion of the mobility vehicle is inserted into the holder recess, is a parking direction, the mobility vehicle may include a first mobility vehicle and a second mobility vehicle. The base may include a first base and a second base disposed to be adjacent to each other along the parking direction, and configured such that the first mobility vehicle and the second mobility vehicle are seated thereon, respectively. The first base may include a first seating part, on which a tire of the first mobility vehicle is seated when a portion of the first mobility vehicle is inserted into the holder recess. The second base may include a second seating part, on which a tire of the second mobility vehicle is seated when a portion of the second mobility vehicle is inserted into the holder recess. A first seating height, which is a height of an upper end of the first seating part with respect to the ground surface, and a second seating height, which is a height of an upper end of the second seating part with respect to the ground surface, may be different.

Furthermore, when a front side or a rear side of the mounting apparatus is viewed, a handle of the first mobility vehicle seated on the first seating part and a handle of the second mobility vehicle seated on the second seating part may partially overlap each other when projected to each other along an upward/downward (i.e., vertical) direction.

Furthermore, the first base may further include a first inclined part provided with a first inclined surface that is an inclined surface extending rearwards and inclined from a rear end of the first seating part toward the ground surface. The second base may further include a second inclined part provided with a second inclined surface that is an inclined surface extending rearwards and inclined from a rear end of the second seating part toward the ground surface.

Furthermore, a first inclination angle, which may be an angle defined by the first inclined surface and the ground surface, and a second inclination angle, which may be an angle defined by the second inclined surface and the ground surface, may be different.

Furthermore, a height of an upper end of the first inclined part with respect to the ground surface may be the same as the height of the upper end of the first seating part with respect to the ground surface. A height of an upper end of the second inclined part with respect to the ground surface may be the same as the height of the upper end of the second seating part with respect to the ground surface.

Furthermore, a plurality of first bases may be provided and a plurality of second bases may be provided. The plurality of first bases and the plurality of second bases may be alternately disposed along the parking direction.

Furthermore, the mounting apparatus may further include a support part extending in an upward/downward direction between the holder and the base. The base may include a first engaging part that is fixed to the ground and having a first screw thread, and a second engaging part provided at a lower portion of the support part and having a second screw thread that is engaged with the first screw thread.

Furthermore, any one of the first screw thread and the second screw thread may be a spiral groove, and the other of the first screw thread and the second screw thread may be engaged with the spiral groove.

Furthermore, a hollow portion extending in the upward/downward direction may be formed in the first engaging part. The second engaging part may be configured to be selectively inserted into the hollow portion. The second engaging part may be inserted into the hollow portion when the support part is rotated about a rotation axis extending in the upward/downward direction.

Furthermore, the mounting apparatus may further include a support part extending in an upward/downward direction between the holder and the base. The base may include a first leg disposed at a lower portion of the support part, and a second leg disposed at the lower portion of the support part, the second leg being spaced apart from the first leg in a leftward/rightward direction. A tire space, in which a front tire of the mobility vehicle is disposed when the portion of the mobility vehicle is inserted into the holder recess, may be formed between the first leg and the second leg.

Furthermore, the holder may include a holder body surrounding the holder recess and a locker that prevents the mobility vehicle from being extracted from the holder recess in an extraction direction when a pressure of a specific value or less is applied to the mobility vehicle, the portion of which is inserted into the holder recess. The extraction direction may be a direction opposite to a direction in which the portion of the mobility vehicle is inserted into the holder recess.

Furthermore, the locker may include a first locking part and a second locking part disposed at opposite ends of the holder body to face each other. Each of the first locking part and the second locking part may include a locker body disposed on a side of the holder body in the extraction direction, a ball pressed in a pressing direction that is a direction that is skewed from the extraction direction when contacting the portion of the mobility vehicle and moved in the pressing direction with respect to the locker body when being pressed, and an elastic member that applies a restoring force to the ball in an opposite direction to the pressing direction. The ball may be moved with respect to the locker body in the opposite direction to the pressing direction by the restoring force of the elastic member when the contact with the portion of the mobility vehicle is released.

Furthermore, an accommodation recess that is recessed in the pressing direction may be formed in the locker body. At least a portion of the elastic member and the ball may be accommodated in the accommodation recess. An area of the ball that is accommodated in the accommodation recess when being pressed by the portion of the mobility vehicle may be larger than an area of the ball that is accommodated in the accommodation recess when the pressing is released.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
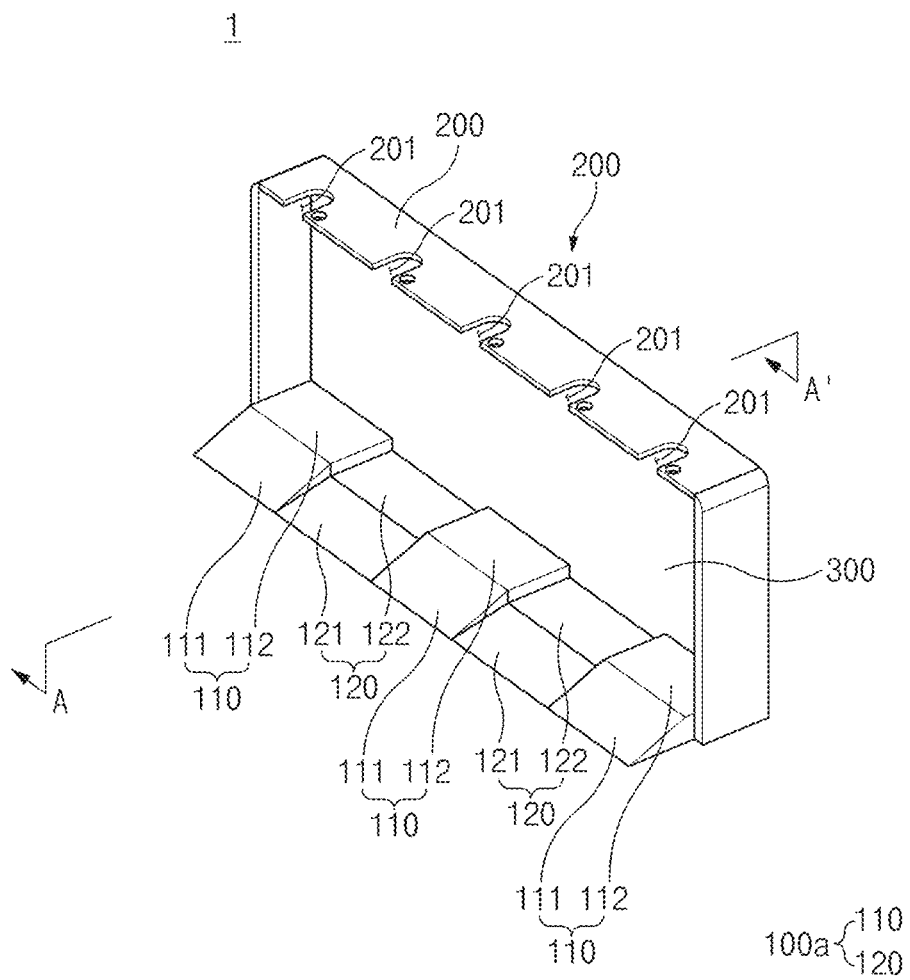
FIG. 1 is a perspective view of a mounting apparatus according to a first embodiment of the present disclosure.

Hereinafter, some embodiments of the present disclosure are described in detail with reference to the drawings. Throughout the specification, it is noted that the same or like reference numerals denote the same or like components even though they are provided in different drawings. Further, in the following description of the present disclosure, a detailed description of known functions and configurations incorporated herein has been omitted when it may make the subject matter of the present disclosure rather unclear.

In addition, terms, such as first, second, A, B, (a), (b) or the like may be used herein when describing components of the present disclosure. The terms are provided only to distinguish the components from other components, and the essences, sequences, orders, and the like of the components are not limited by the terms. It may be understood that when it is described that a component is "connected to", "seated on", "inserted into", "extracted from", or "pressed against" another component, the first component may be directly connected to, seated on, inserted into, extracted from, or pressed against the second component, but a third component may be connected, seated, inserted, extracted, or pressed between the two components.

Hereinafter, referring to FIGS. 1-4, a mounting apparatus 1 according to a first embodiment of the present disclosure is described.

Referring to FIG. 1-4, a mobility vehicle 2 may be held on the mounting apparatus 1. The mounting apparatus 1 may be disposed at an allowable parking location of the mobility vehicle 2, and may provide a parking space for parking the mobility vehicle 2. The mobility vehicle 2, for example, may include a manual kickboard, to which power is applied by a user, and an electric kickboard that receives power from an electric motor to travel. Furthermore, the mobility vehicle 2 may include a handle 21 manipulated by the user, a shaft part 22 rotated in correspondence to rotation of the handle 21, a bottom part 23 that supports a leg of the user who is on (i.e., standing on) the mobility vehicle 2, and a front tire 24. A plurality of mobility vehicles 2 may be provided, and the plurality of mobility vehicles 2 may include a first mobility vehicle and a second mobility vehicle. The mounting apparatus 1 includes a base 100a and a holder 200. Furthermore, the mounting apparatus 1 may include a support part 300.

The base 100a may be supported by a ground surface "G". For example, the base 100a may be disposed on the ground surface "G". Furthermore, the base 100a may support a lower portion of the mobility vehicle 2 when the mobility vehicle 2 is held on the mounting apparatus 1. The base 100a includes a first base 110 and a second base 120. A plurality of first bases 110 and a plurality of second bases 120 may be provided. The plurality of first bases 110 and the plurality of second bases 120 may be alternately disposed along the parking direction. The parking direction may be defined as a direction that is skewed from a forward/rearward direction. The parking direction, for example, may be a leftward/rightward direction.

The first base 110 may include a first inclined part 111 and a first seating part 112. The first inclined part 111 may guide a front tire 24 of the first mobility vehicle to the first seating part 112 when the first mobility vehicle enters the mounting apparatus 1. The first inclined part 111 may be provided with a first inclined surface. The first inclined surface may extend rearwards to be inclined from a rear end of the first seating part 112 toward the ground surface. In the specification, a forward direction may be defined as a direction in which the first inclined part 111 faces the first seating part 112 and a rearward direction may be defined as an opposite direction to the forward direction.

The first seating part 112 may provide a seating surface, on which the front tire of the first mobility vehicle may be seated when the first mobility vehicle is held on the mounting apparatus 1. The seating surface of the first seating part 112 may be an upper surface of the first seating part 112. The first seating part 112 may extend forwards from a front end of the first inclined part 111.

Figure 2:
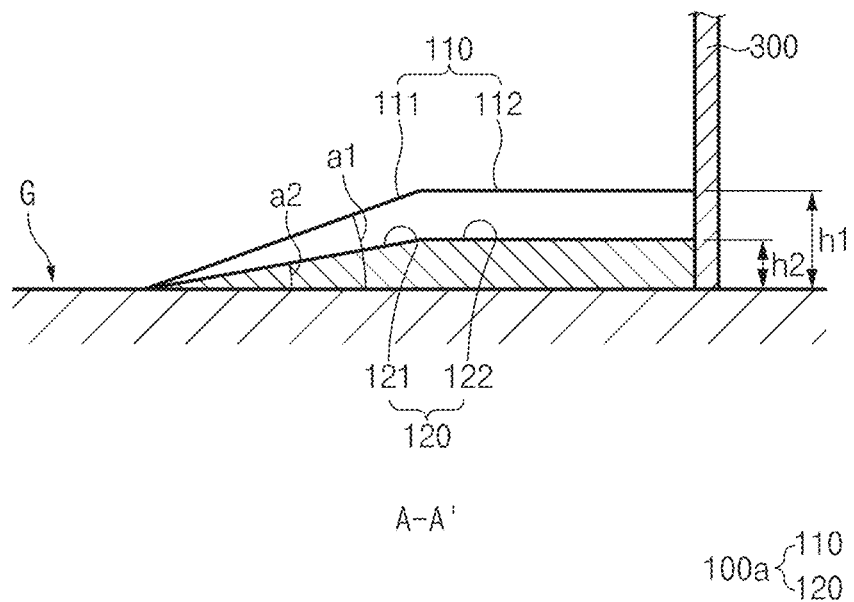
FIG. 2 is a longitudinal sectional view of a mounting apparatus taken along line A-A' of FIG. 1.
Figure 3:
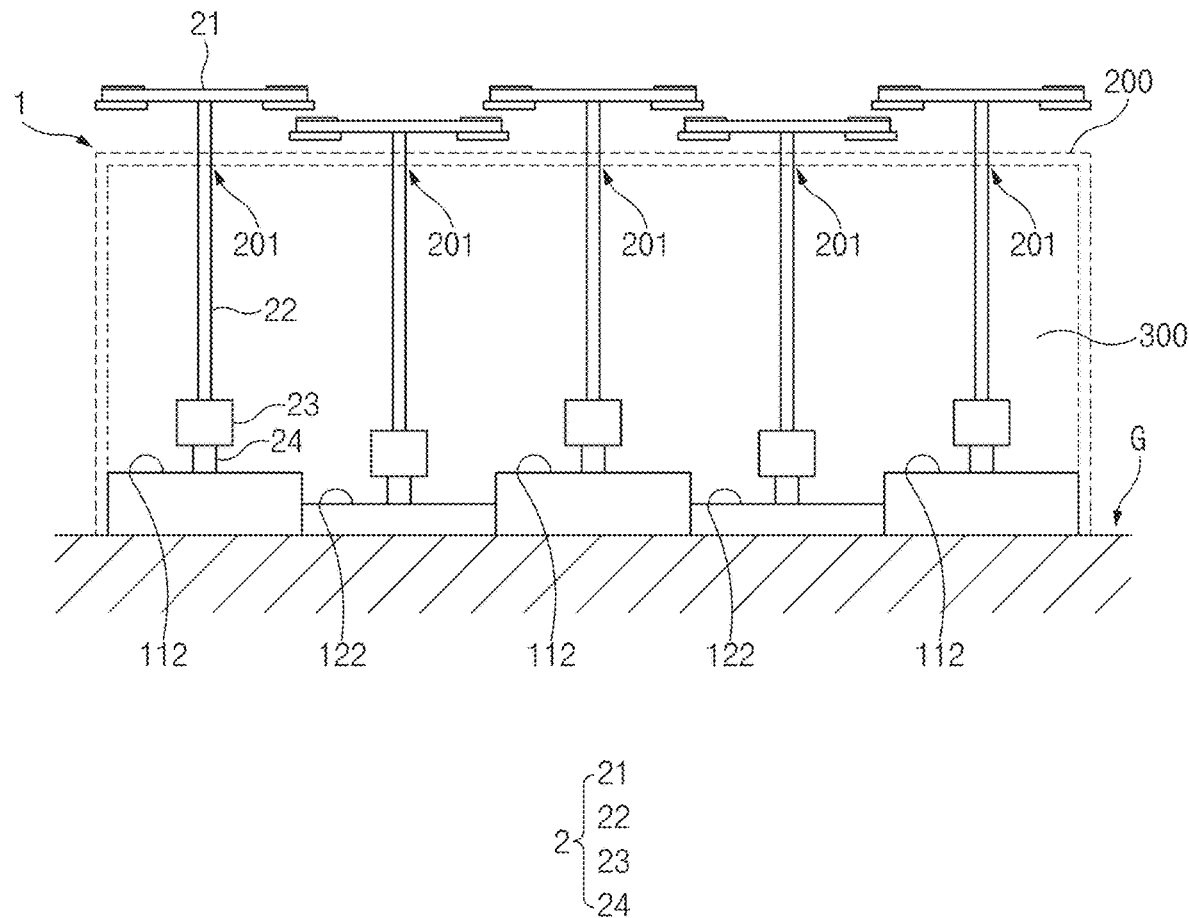
FIG. 3 is a front view of a mounting apparatus according to a first embodiment of the present disclosure.

Referring to FIG. 2, a first seating height h1 that is a height of an upper end of the first seating part 112 with respect to a ground surface "G" may be the same as a first inclination height that is a height of an upper end of the first inclined part 111 with respect to the ground surface "G". The description that the heights of the configurations are the same in the specification may be construed by a person having ordinary skill in the art not only that the heights of the configurations are completely the same, but also that the heights of the configurations are substantially the same (i.e., very similar such that they show substantially the same effect), but different due to tolerances or the like. The same concept may be similarly applied to relationships of other configurations as follows.

The second base 120 may include a second inclined part 121 and a second seating part 122. The second inclined part 121 may guide the front tire 24 of the second mobility vehicle to the second seating part 122 when the second mobility vehicle enters the mounting apparatus 1. The second inclined part 121 may be provided with a second inclined surface. The second inclined surface may extend rearwards to be inclined from a rear end of the second seating part 122 toward the ground surface.

A forward/rearward width of the first inclined surface and a forward/rearward width of the second inclined surface, for example, may be the same. However, the present disclosure is not limited to this example. In another example, the forward/rearward width of the first inclined surface and the forward/rearward width of the second inclined surface may be different. In other words, to accommodate the mobility vehicles having different sizes, the forward/rearward widths of the first inclined surface and the second inclined surface may be different. For example, when the sizes of the first mobility vehicle and the second mobility vehicle are different, a forward/rearward width of the first inclined surface and a forward/rearward width of the second inclined surface may be different to correspond to the different sizes of the first mobility vehicle and the second mobility vehicle. As a more detailed example, when the size of the first mobility vehicle is larger than the size of the second mobility vehicle, the forward/rearward width of the first inclined surface may be larger than the forward/rearward width of the second inclined surface. As another example, when the size of the first mobility vehicle is smaller than the size of the second mobility vehicle, the forward/rearward width of the first inclined surface may be smaller than the forward/rearward width of the second inclined surface.

Furthermore, second inclination heights of upper ends of the first inclination height and the second inclination height with respect to the ground surface "G" may be different. For example, a step may be formed in the upward/downward (i.e., vertical) direction between the first inclined part 111 and the second inclined part 121.

Furthermore, a first inclination angle a1 that is an inclination angle of the first inclined part 111 may be different from a second inclination angle a2 that is an inclination angle of the second inclined part 121. The first inclination angle a1 may be defined as an angle defined by the first inclined surface and the ground surface "G". Furthermore, the second inclination angle a2 may be defined as an angle defined by the second inclined surface and the ground surface "G". For example, referring back to FIG. 2, the first inclination angle a1 may be larger than the second inclination angle a2 when the forward/rearward width of the first inclined surface and the forward/rearward width of the second inclined surface are the same and the first inclination height is larger than the second inclination height.

The second seating part 122 may provide a seating surface, on which the front tire of the second mobility vehicle may be seated when the second mobility vehicle is held on the mounting apparatus 1. The seating surface of the second seating part 122 may be an upper surface of the second seating part 122. The second seating part 122 may extend forwards from a front end of the second inclined part 121.

The forward/rearward width of the second seating part 122 may be the same as the forward/rearward width of the first seating part 112. Furthermore, the second seating heights h2 of the upper ends of the first seating height h1 and the second seating part 122 with respect to the ground surface "G" may be different. For example, the first seating height h1 may be larger than the second seating height h2. A step may be formed in the upward/downward direction between the first seating part 112 and the second seating part 122.

Furthermore, referring back to FIG. 3, a handle 21 of the first mobility vehicle seated on the first seating part 112 and a handle 21 of the second mobility vehicle seated on the second seating part 122 may partially overlap each other when projected to each other along the upward/downward direction (i.e., in a vertical direction), when they are viewed along the forward/rearward direction as in FIG. 3. In other words, through the difference of the heights of the first seating part 112 and the second seating part 122, the handles of the first mobility vehicle and the second mobility vehicle may not interfere with each other even when they are rotated.

The holder 200 may be supported by the base 100a. A holder recess 201, into which a portion of the mobility vehicle 2 may be inserted, may be formed in the holder 200. The portion of the mobility vehicle 2, which may be inserted into the holder recess 201, for example, may be an upper portion of the shaft part 22 of the mobility vehicle. One end of the shaft part 22 of the mobility vehicle may be connected to the handle 21, and an opposite end thereof may be connected to the front tire 24 such that the front tire 24 may be steered.

The holder recess 201 may be formed on a rear side of the holder 200. For example, the holder recess 201 may be a groove that is formed on a rear side of the holder 200 to be recessed forwards. A plurality of holder recesses 201 may be provided. The plurality of holder recesses 201 may be disposed to be spaced apart from each other along the leftward/rightward direction. Furthermore, the plurality of holder recesses 201 may be disposed to correspond to the plurality of first bases 110 and the plurality of second bases 120. For example, the number of the plurality of holder recesses 201 may correspond to the plurality of first bases 110 and the plurality of second bases 120. In more detailed example, when three first bases 110 are provided and two second bases 120 are provided, five holder recesses 201 may be provided. However, the spirit of the present disclosure is not limited to this example, and the number of the first bases 110 may be equal to or smaller than three, the number of the second bases 120 may be equal to or smaller than two, and the number of the second bases 120 may be larger than the number of the first bases 110.

Furthermore, a leftward/rightward spacing distance between the two adjacent holder recesses 201, among the plurality of holder recesses 201, may be smaller than a distance between the opposite ends of the handle 21 of the mobility vehicle 2. In this way, even though the leftward/rightward spacing distance of the two adjacent holder recesses 201 is smaller than the distance between the opposite ends of the handle 21, the handles of the two mobility vehicles 2 that are parked adjacent to each other may not interfere with each other due to the difference of the heights of the first seating part 112 and the second seating part 122. Accordingly, when the leftward/rightward widths of the conventional base having no step and the base 100 of the present disclosure are the same, the number of the mobility vehicles that may be parked in the conventional base is larger than the number of the mobility vehicles that may be parked in the base 100a according to the present disclosure. According to the mounting apparatus 1 according to the first embodiment of the present disclosure, a ground surface area that is necessary for parking of the two adjacent mobility vehicles 2 may be minimized.

The holder 200 may support a portion of the mobility vehicle 2 such that the mobility vehicle 2 is prevented from deviating from an upright state when the portion of the mobility vehicle 2 is inserted into the holder recess 201. The upright state may mean a state in which the shaft part 22 of the mobility vehicle 2 is inclined at less than a specific angle with respect to an imaginary line that extends in the upward/rightward direction when a front side or a rear side of the mobility vehicle 2 held on the mounting apparatus 1 is viewed.

The support part 300 may support the holder 200. The support part 300 may extend in the upward/downward direction between the base 100a and the holder 200. Furthermore, a lower portion of the support part 300 may be connected to the base 100a, and an upper portion thereof may be connected to the holder 200.

Hereinafter, referring to FIGS. 4-9, a mounting apparatus 1 according to a second embodiment of the present disclosure is described. Furthermore, with regard to the second embodiment of the present disclosure, a difference from the first embodiment of the present disclosure is mainly described.

Figure 4:
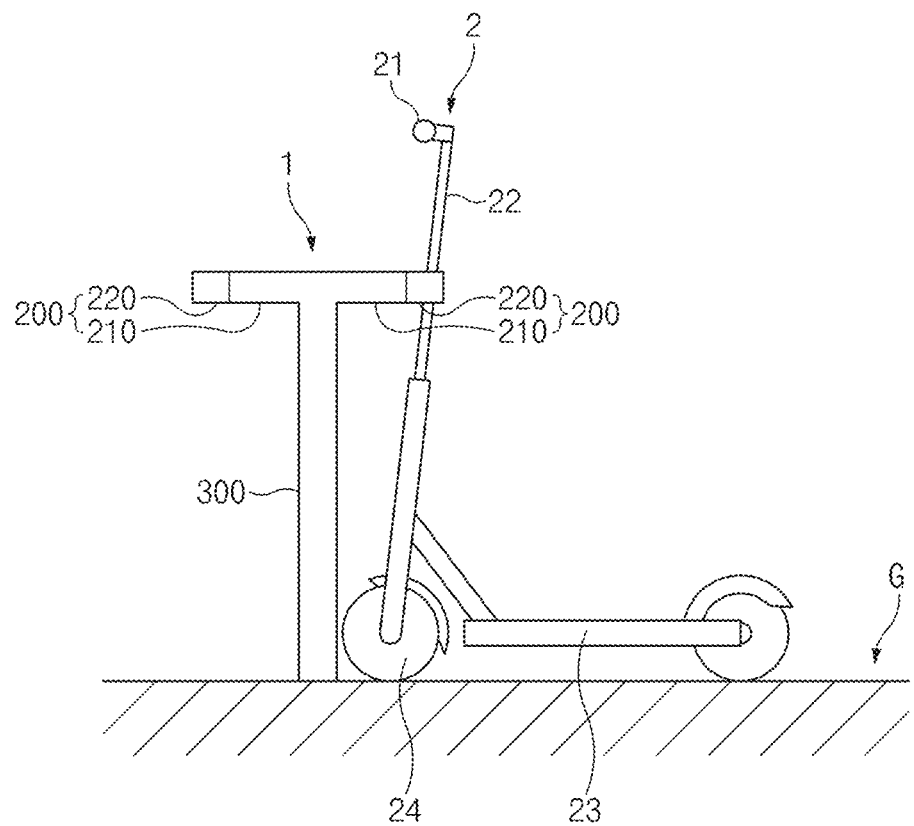
FIG. 4 is a side view of a mounting apparatus and a mobility vehicle according to a second embodiment of the present disclosure.
Figure 5:
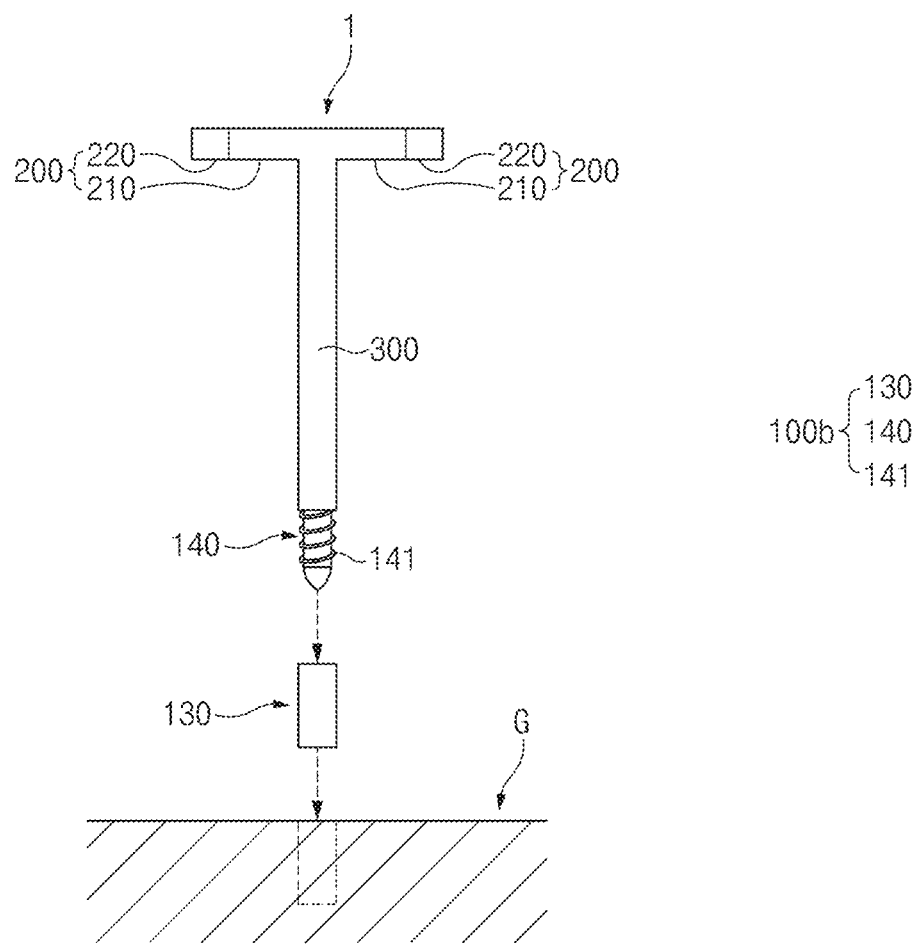
FIG. 5 is a side view of a mounting apparatus according to a second embodiment of the present disclosure.
Figure 6:
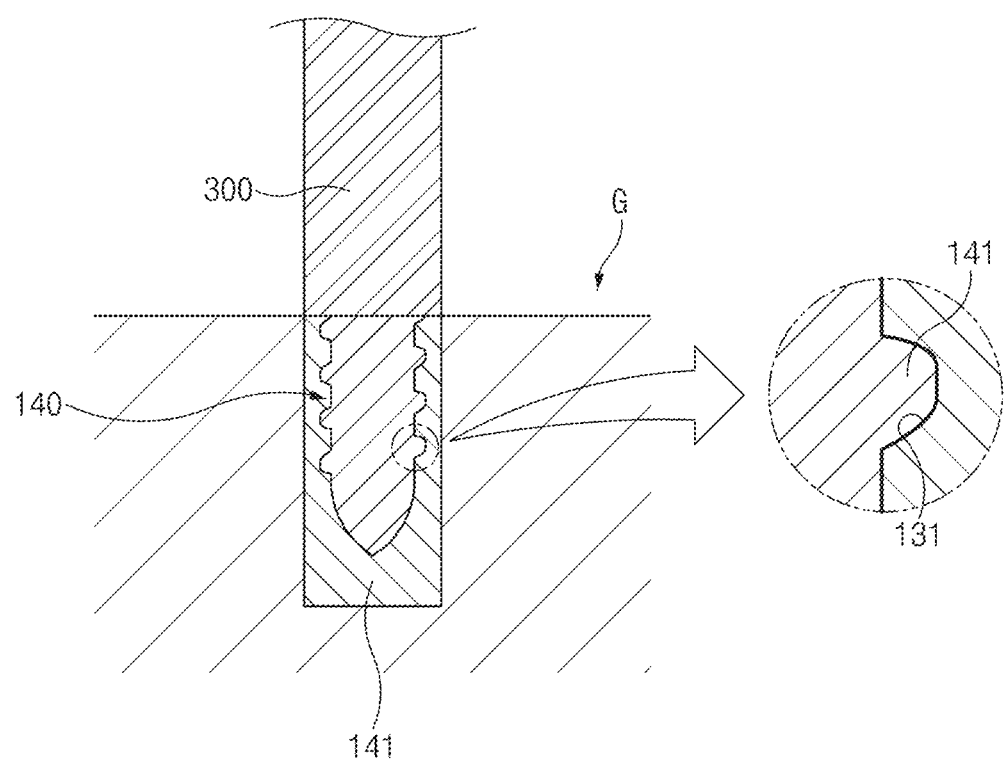
FIG. 6 is a longitudinal sectional view of a mounting apparatus according to a second embodiment of the present disclosure.

Referring to FIGS. 4-6, the base 100b may include a first engaging part 130 and a second engaging part 140. The first engaging part 130 may be configured to be fixed to the ground surface "G". Furthermore, a first screw thread 131 that may be engaged with the second engaging part 140 may be formed in the first engaging part 130. The first screw thread 131, for example, may be a spiral groove that is formed on an inner peripheral surface of the first engaging part 130. The first screw thread 131 may be named 'a female screw thread'.

The second engaging part 140 may be provided at a lower portion of the support part 300. The second engaging part 140, for example, may be integrally formed with the support part 300. A second screw thread 141 that may be engaged with the first screw thread 131 may be formed in the second engaging part 140. The second screw thread 141, for example, may be a spiral boss that is formed on an outer peripheral surface of the second engaging part 140. The second screw thread 141 may be named 'a male screw thread'.

The second engaging part 140 may be inserted into a hollow portion of the first engaging part 130 when the support part 300 is rotated about an imaginary rotation axis that extends in the upward/downward direction. For example, when the support part 300 is rotated while the second engaging part 140 approaches an upper end of the first engaging part 130, the second engaging part 140 may be moved downwards toward the hollow portion of the first engaging part 130 while the first screw thread 131 and the second screw thread 141 are engaged with each other. When the second engaging part 140 is completely inserted into the hollow portion, the holder 200 and the support part 300 may be fixed to the ground surface "G".

Furthermore, the holder 200 may include a holder body 210 and a locker 220. The holder body 210 may be connected to a side surface of the support part 300. The holder body 210 may support the locker 220. Furthermore, the holder body 210 may have a "U" shape that surrounds the holder recess 201. A plurality of holder bodies 210 may be provided. For example, the plurality of holder bodies 210 may be arranged along an outer peripheral surface of the support part 300.

The locker 220 may prevent the mobility vehicle 2 from being extracted from the holder recess 201 when a pressure of a specific value or less is applied to the mobility vehicle 2, the shaft part 22 of which is inserted into the holder recess 201, rearwards. The locker 220 may include a first locking part 221 and a second locking part 222. The first locking part 221 and the second locking part 222 may be disposed at opposite ends of the holder body 210 to face each other. The opposite ends of the holder body 210 may mean two ends provided on a side of the holder body 210 in the extraction direction. The extraction direction may mean an opposite direction to the direction in which the shaft part 22 is inserted into the holder recess 201. In regard to the extraction direction, the extraction directions corresponding to the plurality of holder recesses 201 arranged along an outer peripheral surface of the support part 300 may be different.

Figure 7:
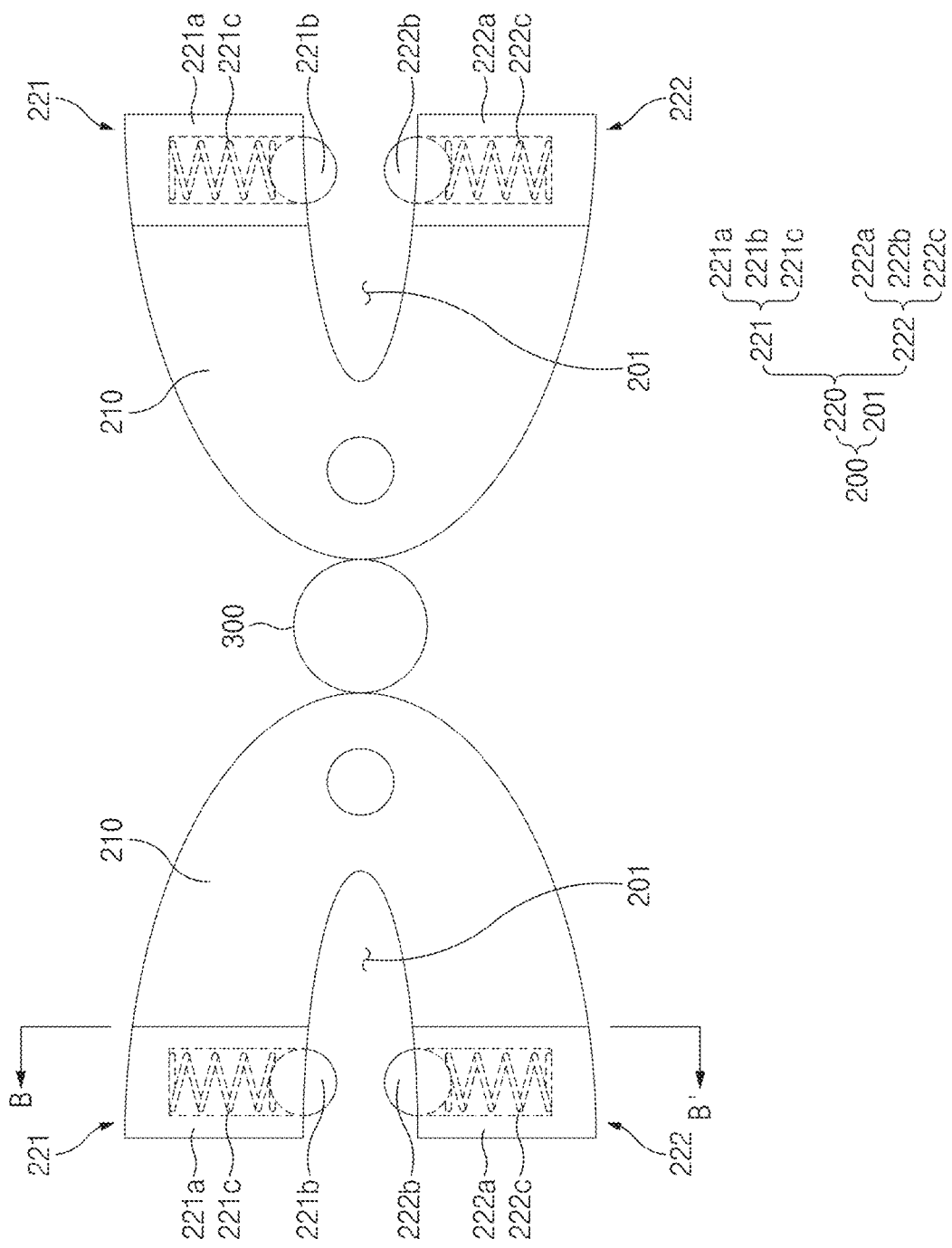
FIG. 7 is a plan view of a mounting apparatus according to a second embodiment of the present disclosure.

Referring to FIGS. 6 and 7, each of the first locking part 221 and the second locking part 222 may include a locker body 221a and 222a, a ball 221b and 222b, and an elastic member 221c and 222c. The locker bodies 221a and 222a may be disposed at opposite ends of the holder body 210 in the extraction direction. The locker bodies 221a and 222a may support the balls 221b and 222b and the elastic members 221c and 222c. Furthermore, accommodation recesses 221a-1 and 222a-1 may be formed in the locker bodies 221a and 222a, respectively. The accommodation recesses 221a-1 and 222a-1 may be grooves that are recessed in the locker bodies 221a and 222a in the pressing direction. The pressing direction may be defined as a direction that is skewed from the extraction direction. That pressing direction, for example, may be a direction that is perpendicular to the extraction direction and the upward/downward direction. At least a portion of the elastic member 221c and 222c and the balls 221b and 222b may be accommodated in the accommodation recesses 221a-1 and 222a-1.

Figure 8:
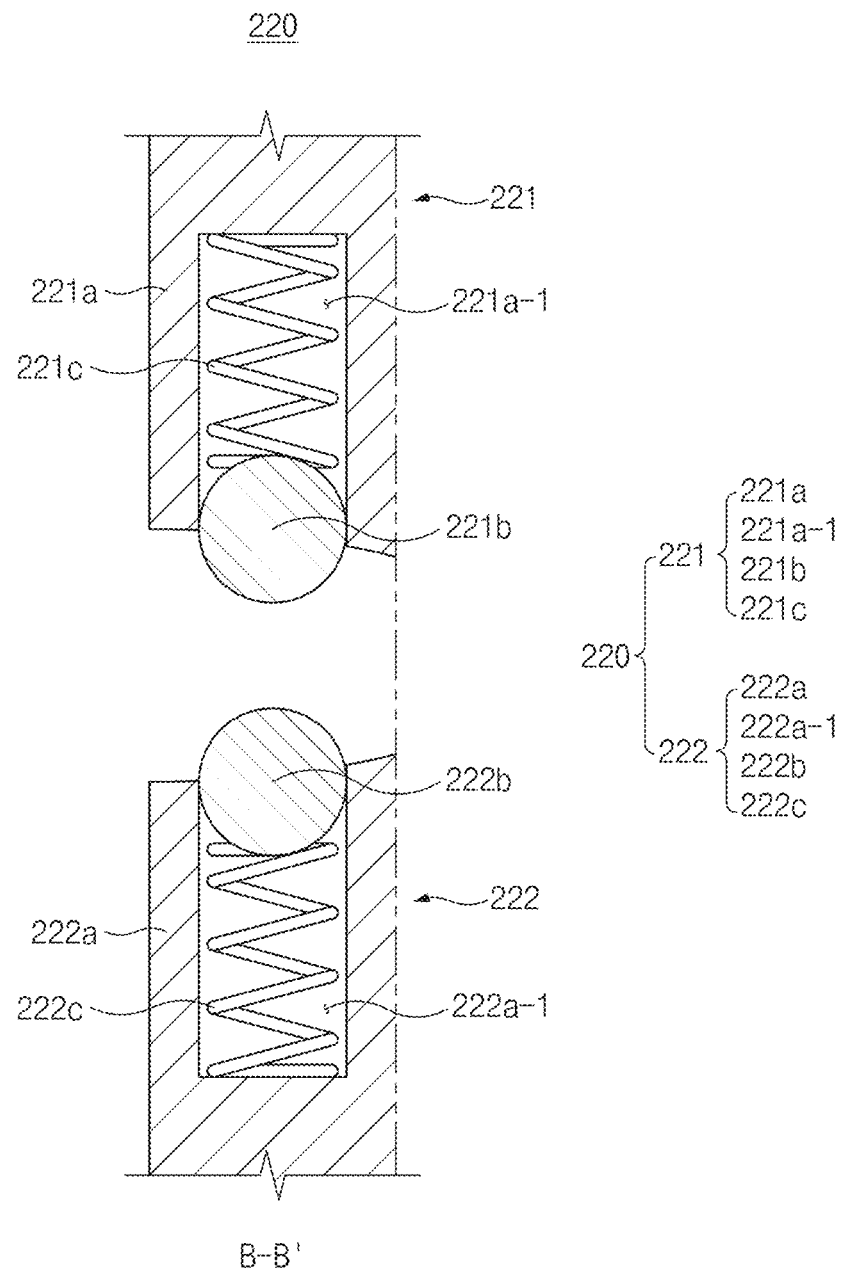
FIG. 8 is a transverse sectional view taken along line B-B' of FIG. 7.
Figure 9:
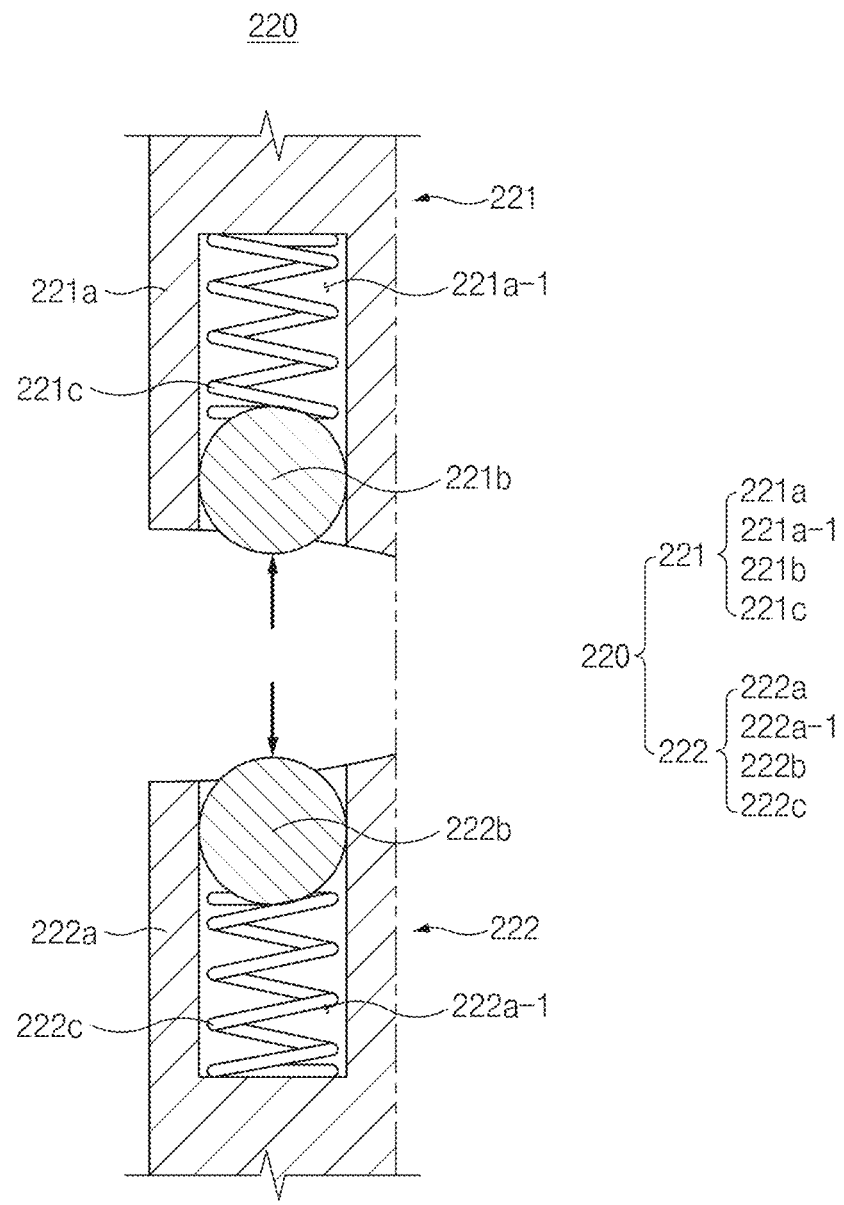
FIG. 9 is a transverse sectional view of a locker illustrating a state in which a ball and an elastic member of FIG. 8 are moved.

Referring to FIG. 8, the balls 221b and 222b may contact the shaft part 22 when the shaft part 22 enters the holder recess 201. The balls 221b and 222b may be pressed in the pressing direction when contacting the shaft part 22. The balls 221b and 222b may be moved in the pressing direction against the locker bodies 221a and 222a when being pressed by the shaft part 22. Areas in which the balls 221b and 222b are accommodated in the accommodation recesses 221a-1 and 222a-1 may be increased as the balls 221b and 222b are moved in the pressing direction against the locker bodies 221a and 222a.

The balls 221b and 222b may be moved with respect to the locker bodies 221a and 222a in an opposite direction to the pressing direction by restoring forces of the elastic members 221c and 222c when the contact with the shaft part 22 is released. Areas in which the balls 221b and 222b are accommodated in the accommodation recesses 221a-1 and 222a-1 may be decreased as the balls 221b and 222b are moved in an opposite direction to the pressing direction against the locker bodies 221a and 222a.

The elastic members 221c and 222c may apply restoring forces to the balls 221b and 222b in an opposite direction to the pressing direction. The elastic members 221c and 222c, for example, may be compression coil springs. However, the present disclosure is not limited to this example. The elastic members 221c and 222c may provide the restoring forces to the pressed balls 221b and 222b, and may be formed of known elastic materials.

The mounting apparatus 1 according to the second embodiment of the present disclosure may stably maintain the upright state of the mobility vehicle 2 by preventing the mobility vehicle 2 held on the mounting apparatus 1 from being extracted through the locker 220 even when an impact is applied to the mobility vehicle 2 from an outside.

Furthermore, the locker body of the first locking part 221 may be named the first locker body 221a, the locker body of the second locking part 222 may be named the second locker body 222a, the accommodation recess of the first locker body 221a may be named the first accommodation recess 221a-1, the accommodation recess of the second locker body 222a may be named the second accommodation recess 222a-1, the ball of the first locking part 211 may be named the first ball 221b, the ball of the second locking part 222 may be named the second ball 222b, the elastic member of the first locking part 221 may be named the first elastic member 221c, and the elastic member of the second locking part 222 may be named the second elastic member 222c.

Hereinafter, a third embodiment of the present disclosure is described with reference to FIGS. 10-12. Furthermore, with regard to the third embodiment of the present disclosure, a difference from the second embodiment of the present disclosure is mainly described.

Figure 10:
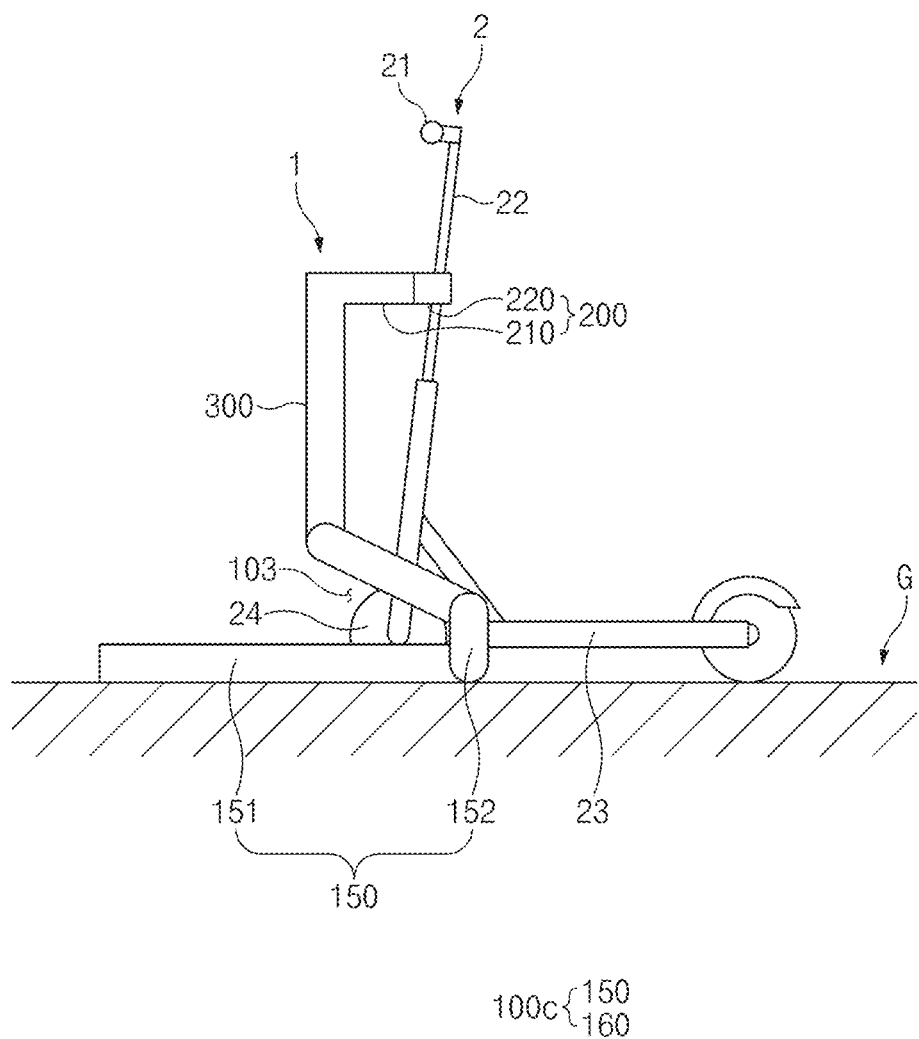
FIG. 10 is a side view of a mounting apparatus and a mobility vehicle according to a third embodiment of the present disclosure.
Figure 11:
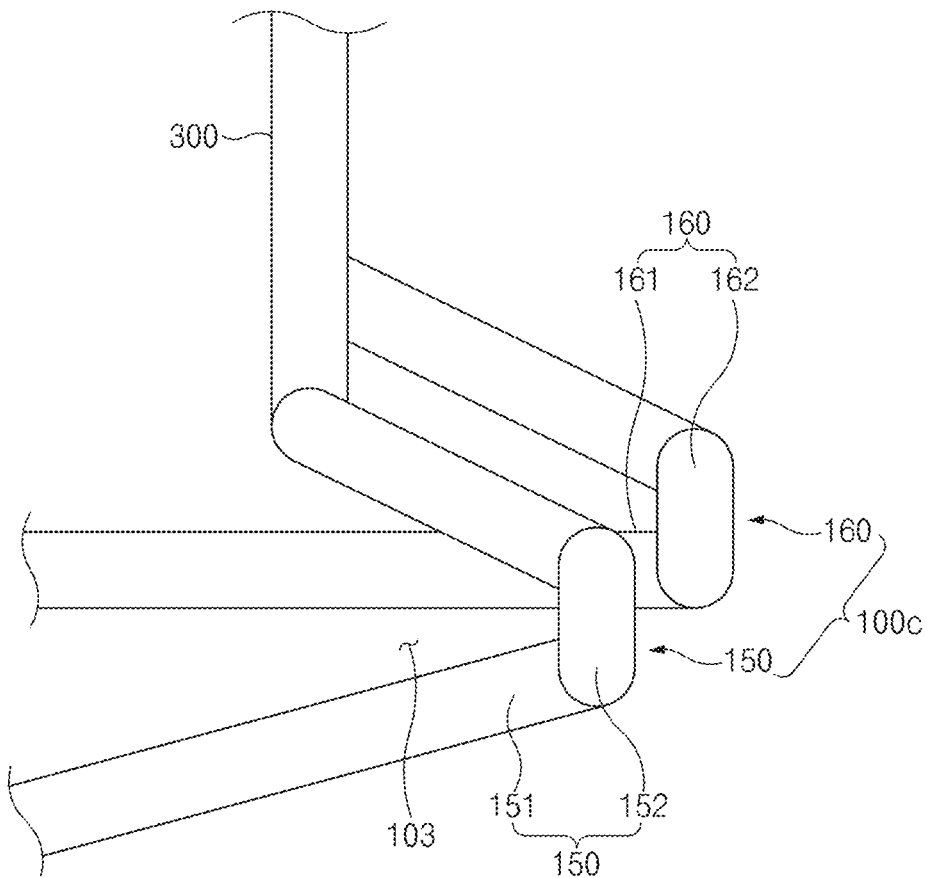
FIG. 11 is a perspective view of a mounting apparatus according to a third embodiment of the present disclosure.
Figure 12:
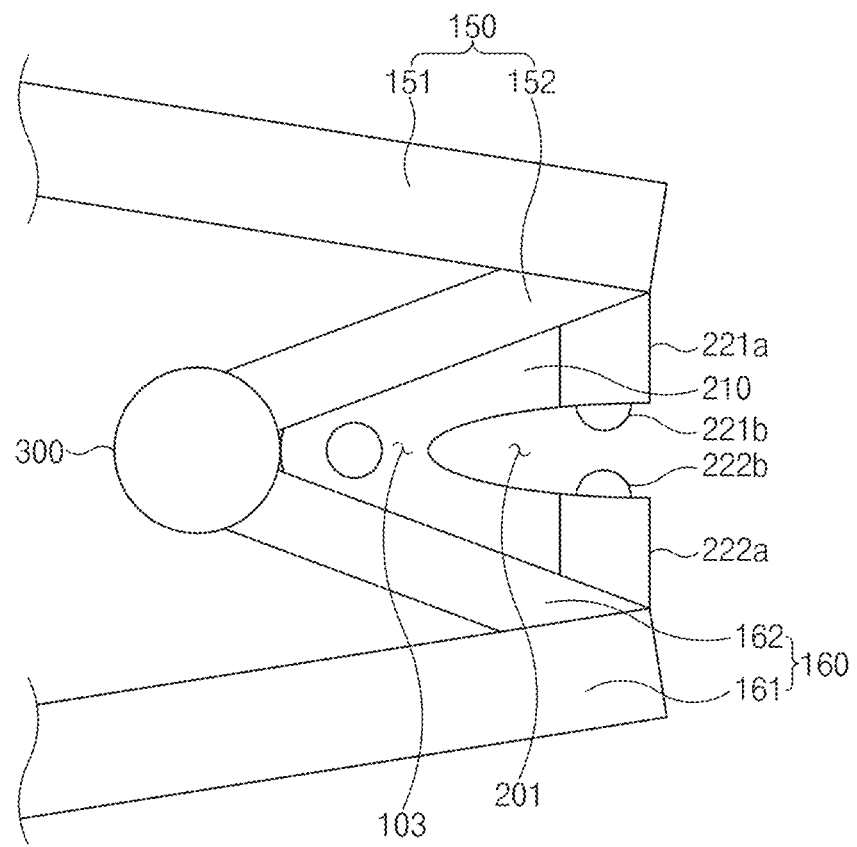
FIG. 12 is a bottom view of a mounting apparatus according to a third embodiment of the present disclosure.

Referring to FIGS. 10-12, the base 100c may include a first leg 150 and a second leg 160. The first leg 150 and the second leg 160 may be disposed at a lower portion of the support part 300 to be spaced apart from each other in the leftward/rightward direction. Each of the first leg 150 and the second leg 160 may include a lower leg 151 and 161 and an upper leg 152 and 162.

The lower legs 151 and 161 may be supported by the ground surface "G" while contacting the ground surface "G". Front ends of the lower legs 151 and 161 may be disposed on a front side of the support part 300, and rear ends of the lower legs 151 and 161 may be disposed on a rear side of the support part 300. Furthermore, the first lower leg 151 that is a lower leg of the first leg 150 and the second lower leg 161 that is a lower leg of the second leg 160 may extend to become farther from each other as they go toward the front side. For example, a spacing distance between a front end of the first lower leg 151 and a front end of the second lower leg 161 may be larger than a spacing distance between a rear end of the first lower leg 151 and a rear end of the second lower leg 161. Through shapes of the first lower leg 151 and the second lower leg 161, the base 100c may prevent the support part 300, the holder 200, and the held mobility vehicle 2 from being easily turned over in the leftward and rightward direction. Furthermore, the upper legs 151 and 162 may extend between the rear ends of the lower legs 151 and 161 and the lower end of the support part 300 to be inclined. A spacing distance between the upper end of the first upper leg 152 that is an upper leg of the first leg 150 and the upper end of the second upper leg 162 that is an upper leg of the second leg 160 may be smaller than a spacing distance between the lower end of the first upper leg 152 and the lower end of the second upper leg 162. The lower legs 151 and 161 and the upper legs 152 and 162, for example, may be integrally formed.

Furthermore, a tire space 103, in which the front tire 24 of the mobility vehicle 2 may be disposed, may be formed between the first leg 150 and the second leg 160. For example, when the shaft part 22 is inserted into the holder recess 201, the front tire of the mobility vehicle 2 may be disposed in the tire space 103. A side surface of the front tire 24 disposed in the tire space 103 may be surrounded by the first leg 150 and the second leg 160. The mounting apparatus 1 according to the third embodiment of the present disclosure may stably support the holder 200 and the support part 300 and prevent an impact from being applied to the front tire 24 of the parked mobility vehicle 2 from an outside as well, through the first leg 150 and the second leg 160. Furthermore, the handle 21 of the mobility vehicle 2 may be prevented from being rotated arbitrarily by preventing an external impact from being applied to the front tire 24 of the parked mobility vehicle 2 whereby a person who is walking around the mounting apparatus 1 may be prevented from being stricken by the handle 21.

According to the mounting apparatus according to the present disclosure, an electric kickboard may be prevented from deviating from an upright state such that the electric kickboard is prevented from being turned over when the electric kickboard is parked.

Although it may have been described until now that all the elements constituting the embodiments of the present disclosure are coupled to one or coupled to be operated, the present disclosure is not essentially limited to the embodiments. In other words, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not extruded but may be further included. In addition, unless defined otherwise, all terms used herein, including technical or scientific terms, have the same meanings as those generally understood by those having ordinary skill in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those having ordinary skill in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A mounting apparatus comprising:
a base configured to be supported by a ground surface; and
a holder supported by the base and having a holder recess configured such that a portion of a mobility vehicle is inserted thereinto,
wherein the holder supports the portion of the mobility vehicle such that the mobility vehicle is prevented from deviating from an upright state when the portion of the mobility vehicle is inserted into the holder recess,
wherein when a direction that is skewed from a forward direction, which is a direction in which the portion of the mobility vehicle is inserted into the holder recess, is a parking direction,
the mobility vehicle includes a first mobility vehicle and a second mobility vehicle,
wherein the base includes:
a first base and a second base disposed adjacent to each other along the parking direction, and configured such that the first mobility vehicle and the second mobility vehicle are seated thereon, respectively,
wherein the first base includes a first seating part, on which a tire of the first mobility vehicle is seated when a portion of the first mobility vehicle is inserted into the holder recess,
wherein the second base includes a second seating part, on which a tire of the second mobility vehicle is seated when a portion of the second mobility vehicle is inserted into the holder recess,
wherein a first seating height, which is a height of an upper end of the first seating part with respect to the ground surface, and a second seating height, which is a height of an upper end of the second seating part with respect to the ground surface, are different, and
wherein the first seating part and the second seating part are in contact with each other in the parking direction.

2. The mounting apparatus of claim 1, wherein a handle of the first mobility vehicle seated on the first seating part and a handle of the second mobility vehicle seated on the second seating part partially overlap each other along an upward/downward direction.

3. The mounting apparatus of claim 1, wherein the first base further includes a first inclined part provided with a first inclined surface, and
wherein the second base further includes a second inclined part provided with a second inclined surface.

4. The mounting apparatus of claim 3, wherein the first inclined surface is an inclined surface extending rearwards and inclined from a rear end of the first seating part toward the ground surface, and
wherein the second inclined surface is an inclined surface extending rearwards and inclined from a rear end of the second seating part toward the ground surface.

5. The mounting apparatus of claim 3, wherein a first inclination angle, which is an angle defined by the first inclined surface and the ground surface, and a second inclination angle, which is an angle defined by the second inclined surface and the ground surface, are different.

6. The mounting apparatus of claim 3, wherein a height of an upper end of the first inclined part with respect to the ground surface is the same as the height of the upper end of the first seating part with respect to the ground surface, and
wherein a height of an upper end of the second inclined part with respect to the ground surface is the same as the height of the upper end of the second seating part with respect to the ground surface.

7. The mounting apparatus of claim 1, further comprising a plurality of first bases and a plurality of second bases,
wherein the plurality of first bases and the plurality of second bases are alternately disposed along the parking direction.

8. The mounting apparatus of claim 1, further comprising:
a support part extending in an upward/downward direction between the holder and the base,
wherein the base includes:
a first leg disposed at a lower portion of the support part; and
a second leg disposed at the lower portion of the support part, the second leg being spaced apart from the first leg in a leftward/rightward direction, and
wherein a tire space, in which a front tire of the mobility vehicle is disposed when the portion of the mobility vehicle is inserted into the holder recess, is formed between the first leg and the second leg.

9. The mounting apparatus of claim 1, wherein the holder includes:
a holder body surrounding the holder recess; and
a locker configured to prevent the mobility vehicle from being extracted from the holder recess in an extraction direction when a pressure of a specific value or less is applied to the mobility vehicle, the portion of which is inserted into the holder recess, wherein the extraction direction is a direction opposite to a direction in which the portion of the mobility vehicle is inserted into the holder recess.

10. The mounting apparatus of claim 9, wherein the locker includes:
a first locking part and a second locking part, each of which is disposed at opposite ends of the holder body to face each other,
wherein each of the first locking part and the second locking part includes:
a locker body disposed on a side of the holder body in the extraction direction;
a ball pressed in a pressing direction that is a direction that is skewed from the extraction direction when contacting the portion of the mobility vehicle and moved in the pressing direction with respect to the locker body when being pressed; and
an elastic member configured to apply a restoring force to the ball in an opposite direction to the pressing direction, and wherein the ball is moved with respect to the locker body in the opposite direction to the pressing direction by the restoring force of the elastic member when the contact with the portion of the mobility vehicle is released.

11. The mounting apparatus of claim 10, wherein an accommodation recess that is recessed in the pressing direction is formed in the locker body, wherein at least a portion of the elastic member and the ball is accommodated in the accommodation recess, and wherein an area of the ball that is accommodated in the accommodation recess when being pressed by the portion of the mobility vehicle is larger than an area of the ball that is accommodated in the accommodation recess when the pressing is released.

\* \* \* \* \*